United States Patent [19]

Razvi

[11] 4,107,452
[45] Aug. 15, 1978

[54] ELECTRICALLY CONDUCTIVE PIPE FITTING

[76] Inventor: Masood H. Razvi, 1889 Roberts St., Aurora, Ill. 60506

[21] Appl. No.: 732,378

[22] Filed: Oct. 14, 1976

[51] Int. Cl.$^2$ .............................................. F16L 11/12
[52] U.S. Cl. ................................ 174/84 S; 361/215; 285/55; 285/323; 285/81; 285/383; 285/423
[58] Field of Search .................. 285/81, 55, 353, 323, 285/356, 343, 379, 423, 348, 369, 383, 250; 174/84 R; 361/215

[56] References Cited

U.S. PATENT DOCUMENTS

| | | | |
|---|---|---|---|
| 1,743,315 | 1/1930 | Callender | 285/343 |
| 2,228,018 | 1/1941 | Scholtes | 285/382.4 X |
| 2,470,546 | 5/1949 | Carlson | 285/356 X |
| 3,498,647 | 3/1970 | Schroeder | 285/343 |
| 3,756,632 | 9/1973 | Riggs et al. | 285/356 X |
| 3,888,519 | 6/1975 | Smith et al. | 285/55 |
| 3,977,704 | 8/1976 | Meyer | 285/55 X |
| 3,986,731 | 10/1976 | DeHoff | 285/81 |

*Primary Examiner*—Wayne L. Shedd
*Attorney, Agent, or Firm*—Lockwood, Dewey, Alex & Cummings

[57] ABSTRACT

A fitting for the end of a plastic pipe segment includes a body having an open-ended bore in which the pipe segment is received. A wedge-shaped grip ring and annular gasket are fitted over the pipe segment and compresses against an annular shoulder provided in the sidewall of the bore by a compression nut threaded into the open end of the bore. Abutting complimentarily inclined surfaces on the compression nut and the grip ring provide simultaneous radial compression of the grip ring and axial compression of the gasket when the compression nut is tightened. A sleeve-shaped stiffener within the pipe segment prevents deformation of the pipe wall. A plurality of radially extending serrations on the inside surface of the grip ring and on the outside surface of the stiffener engage the inner and outer surfaces of the pipe wall to secure the pipe segment to the fitting. An electrically conductive collar may be provided within the bore to establish electrical continuity between adjacent pipe segments.

15 Claims, 5 Drawing Figures

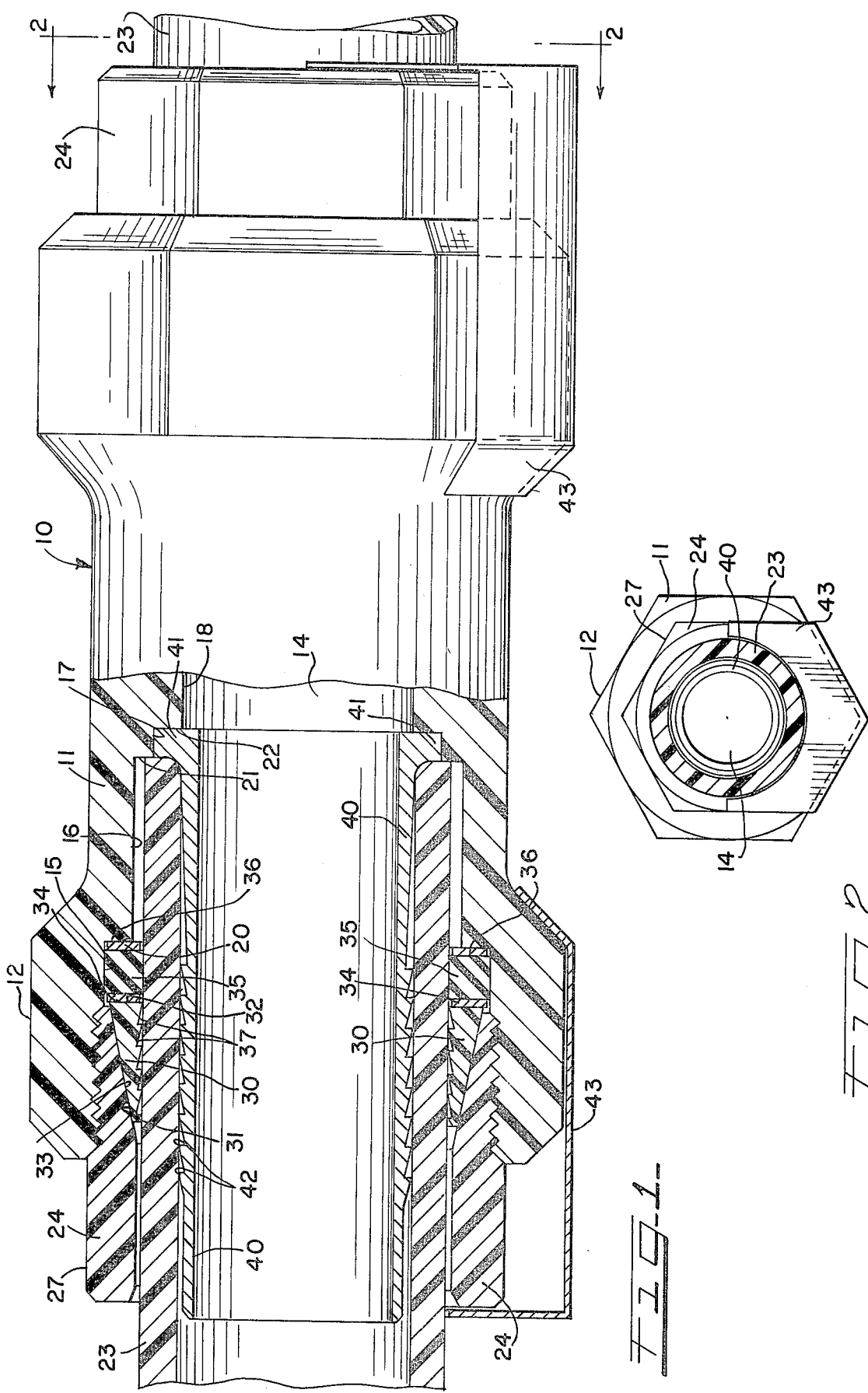

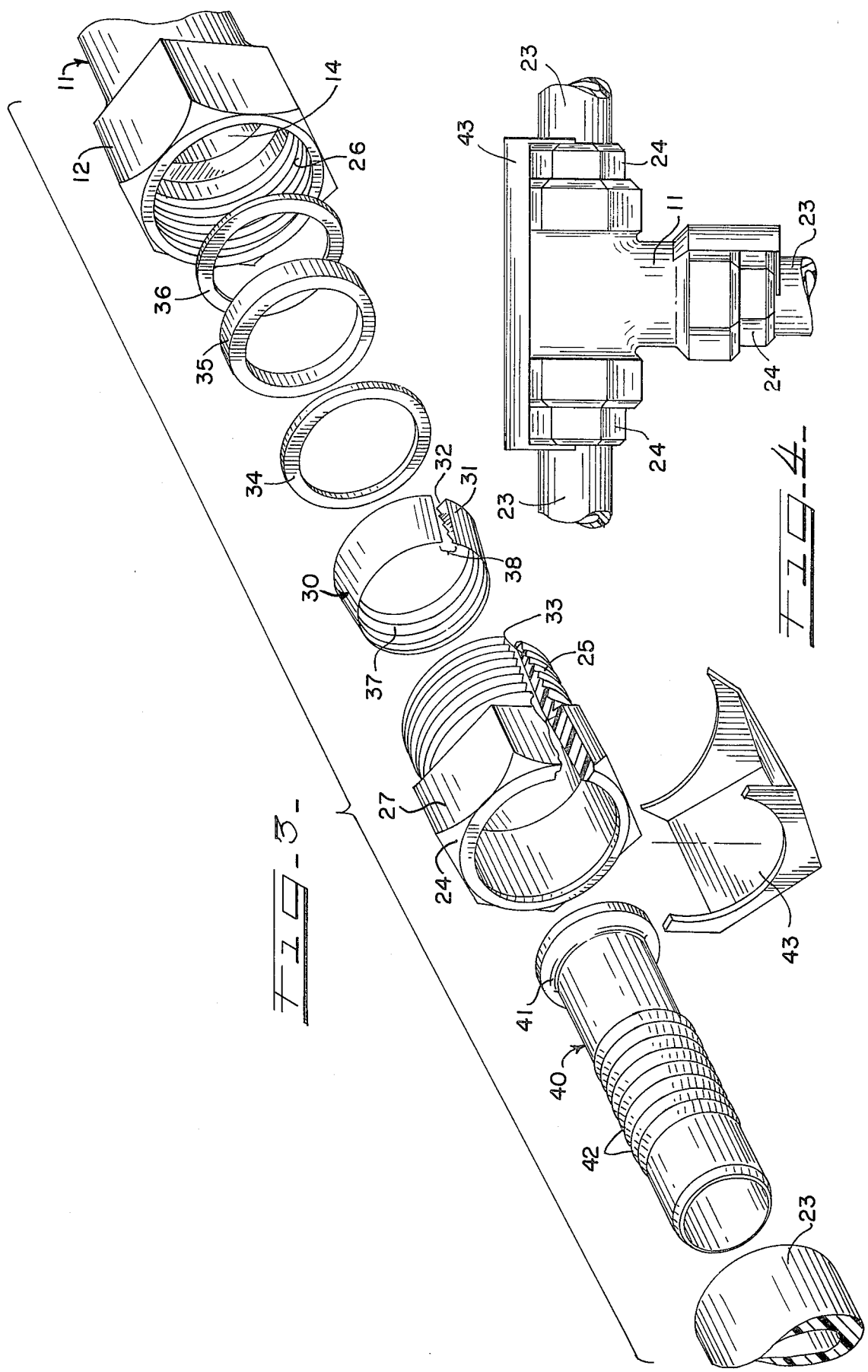

ELECTRICALLY CONDUCTIVE PIPE FITTING

BACKGROUND OF THE INVENTION

This application is directed generally to fittings for pipe, tubing and the like, and more particularly to a new and improved end fitting for connecting plastic pipe segments.

In natural gas distribution networks and other large fluid conveying systems wherein plastic pipe is utilized, it is frequently necessary to couple the end of one plastic pipe segment to the end of another pipe segment, or to a source, or to a service head or other utilization means. Fittings provided in such systems for this purpose must be capable of withstanding large axial stresses without compromise to their sealing capabilities, since the lengths of pipe to which the fittings are attached may extend hundreds of feet and therefore be subject to large temperature-induced length variations, which may amount to as much as one inch per hundred feet per 10° F change in temperature. Furthermore, such fittings must be capable of rapid assembly by relatively unskilled workers, preferably without being disassembled, since the pipes and fittings in such distribution networks are ordinarily buried beneath the ground.

The present invention is directed to a pipe end fitting which meets these requirements, and which can be economically formed from plastic, nylon or similar materials by conventional molding techniques.

Accordingly, it is a general object of the present invention to provide a new and improved fitting for the end of a pipe.

It is another object of the present invention to provide a new and improved fitting which can be assembled on the end of a pipe without disassembly, and which provides improved capability to withstand high axial stresses.

It is another object of the present invention to provide a new and improved end fitting for a pipe segment which can be economically formed from plastic, nylon or similar materials by conventional techniques.

It is another object of the present invention to provide a new and improved fitting for the end of a plastic pipe having an electrically conductive inner liner, and which provides means for maintaining electrical continuity between the liners of adjacent pipe sections.

SUMMARY OF THE INVENTION

The invention is directed to an end fitting for a pipe segment. The fitting comprises a body including an open-ended bore for receiving at least an end portion of the pipe segment. The sidewall of the bore includes an annular shoulder portion, and a region of increased diameter between the shoulder portion and the open end of the bore. A compression nut having an inside diameter substantially corresponding to the outside diameter of the pipe segment, an outside diameter substantially corresponding to the region of increased diameter and a radially inwardly facing inclined inside surface, is threadedly engaged to the body whereby the nut is displaced along the axis of the bore when turned relative to the body. Means including a grip ring disposed over the pipe segment within the region of increased diameter between the compression member and the shoulder, and having an outside surface complimentarily radially outwardly inclined to the inclined inside surface of the compression nut and arranged in close abutting relationship therewith, and means including a gasket disposed over the pipe segment between the grip ring and the shoulder, are provided for forming a seal between the outer surface of the pipe segment and the wall of the bore, the grip ring and the gasket being radially compressed into engagement with the outer wall of the pipe segment when the compression nut is tightened.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals indentify like elements, and in which:

FIG. 1 is an enlarged side elevational view partially in cross-section showing a fitting constructed in accordance with the present ivention installed on the end of a plastic pipe segment.

FIG. 2 is a cross-sectional view of reduced scale taken along line 2—2 of FIG. 1.

FIG. 3 is an exploded perspective view of an end fitting constructed in accordance with the invention.

FIG. 4 is a side elevational view of a T-coupling assembly incorporating end fittings constructed in accordance with the invention.

DESCRIPTION OF THE PREFERRED EMBODIMENT

Figure 5:
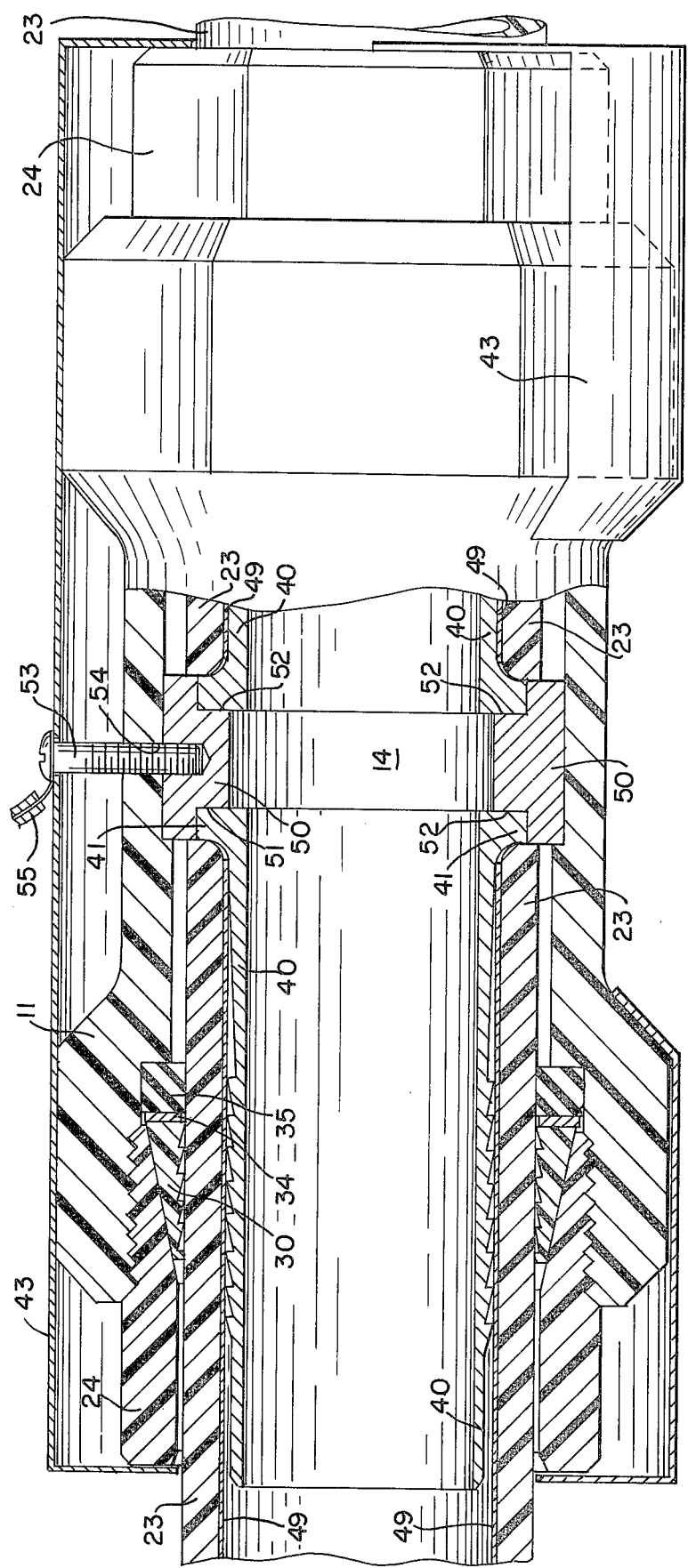
FIG. 5 is an enlarged side elevational view partially in cross-section illustrating a coupling constructed in accordance with the invention for pipe segments having electrically-conductive inner liners.

Referring to the drawings, and particularly to FIGS. 1-3, a pipe fitting constructed in accordance with the invention is shown incorporated in an in-line coupling 10 of the type utilized for joining two pipe segments together. The coupling includes a generally cylindrical body 11 which may be molded from a high-strength plastic. A plurality of tool pads 12 or other wrench engaging surfaces may be provided on the outside surface of the body adjacent each end.

To provide fluid communication between connected pipe segments, body 11 includes an axially extending bore indicated generally by the reference numeral 14. From each end the diameter of the bore progressively decreases in four discrete steps, forming four sections 15-18 extending from each end to the interior of the body. A plurality of annular shoulders 20-22 are formed in the sidewall of bore 14 between respective ones of the four sections. Although only one end of the coupling is shown in cross-section, it will be understood that the other end of bore 14 also includes four sections of decreasing diameter, forming a mirror image to the four bore sections shown with the innermost bore section 18 common to each end.

In use, the ends of pipe segments 23 to which the coupling is attached are inserted into bore 14 at either end. These pipe segments extend into the first and second bore sections 15 and 16, the first section being larger in diameter than the pipe segment and the second section being substantially the same diameter as the pipe section. To secure the pipe segments in position coupling 10 includes a sleeve-shaped compression nut 24 at either end. The inside ends of these compression nuts are dimensioned to fit over pipe segment 23 and within the first bore section 15. The outside surfaces of the nuts include threads 25 (FIG. 3) which engage complimentary threads 26 (FIG. 3) on the inside surface of the first bore section 15 so that when the nuts are turned with respect to the body, the nuts move inwardly along the axis of the pipe, to facilitate turning the compression nuts the outer surfaces of the nuts are preferable provided with tool pads 27 or other wrench engaging surfaces.

Coupling 10 further includes an annular grip ring 30 having an inside diameter sufficient to fit over pipe segment 23 and an outside diameter slightly smaller than the diameter of the first bore section 15. The grip ring, which may be formed of a plastic material identical to that utilized to form compression nut 24, is wedge shaped in cross section, having an outwardly facing inclined surface 31 for engaging compression nut 24, and a flat inwardly facing surface 32 perpendicular to the axis of the coupling. Compression nut 24 includes an inwardly facing surface 33 inclined complementarily to surface 31 for coacting with that surface to axially and radially compress grip ring 30.

To provide a pressure seal between the pipe segment 23 and coupling 10, coupling 10 includes a first washer-shaped retainer ring 36. These elements have inside diameters slightly larger than the outside diameter of pipe segment 23, and outside diameters slightly less than the inside diameter of bore section 15, allowing them to be positioned over pipe 23 between the rear face 32 of grip ring 30 and shoulder 20 of housing 11. When compression nut 24 is turned into housing 11, grip ring 30, retainer ring 34, gasket 35, and retainer ring 35 are compressed together, causing gasket 35, which is preferably formed of an elastomeric material such as rubber, to expand radially and form a positive vapor-tight seal between the outer wall of pipe segment 23 and the wall of bore 14.

To provide a more positive mechanical connection between grip ring 30 and pipe segment 23, the inside surface of grip ring 30 is provided with a plurality of sawtooth-shaped steps or serrations 37 which are brought to bear against the outside surface of the pipe segment as the compression nut 24 is tightened. These serrations are orientated so as to oppose separation of the pipe segment from the fitting and in practice bite into the wall of the pipe segment to a sufficient extent when the fitting is fully tightened to prevent separation under normally encountered axial stresses. Furthermore, the points of contact between the serrations of grip ring 30 and the outside wall of the pipe segment constitute to some extent a seal for assisting gasket 35 in preventing leakage from the pipe segment.

Although sawtooth-shaped serrations are most effective for mechanically locking the pipe segment in position, other types of surfaces, such as knurled surfaces, may be utilized instead. To enable grip ring 30 to be brought to bear against the surface of pipe segment 23, the grip ring is preferably provided with a gap 38 which allows circumferential compression of the grip ring. Retainer ring 34 prevents deformation of gasket 35 into this gap.

To prevent deformation of the pipe wall, a sleeve-shaped stiffener 40 is inserted in the interior of the pipe segment prior to insertion of the pipe segment into body 11. Stiffener 40, which is preferably formed of a hard non-compressible material such as steel, includes a flange portion 41 at its inner end having an outside diameter substantially corresponding to the diameter of bore segment 17. The inside edge of the flange portion is preferably flat and perpendicular to the axis of the coupling to provide a surface which can be brought to bear against shoulder 22. Stiffener 40 extends within pipe segment 23 for a length corresponding at least to that portion of the pipe segment contained within bore 14. The outside diameter of the stiffener corresponds substantially to the inside diameter of the plastic pipe segment, so as grip ring 30 tightens around the pipe segment only a limited deformation of the pipe wall is possible.

To further assist in retaining the pipe segment 23 within coupling 10, the outside surface of stiffener 40 is provided with a plurality of sawtooth-shaped steps or serrations 42 which bite into the inside surface of the pipe wall. As with serrations 37 of grip ring 30, the stiffener serrations 42 are orientated in a direction to oppose removal of the pipe segment and bite into the wall a sufficient extent to assist gasket 41 in maintaining a seal between the pipe segment and the coupling. The outside surface of the stiffener may have a slight inward taper to provide clearance for the serrations and to immunize leakage between the insert and the interior of the pipe segment. Although sawtooth serrations are most effective, other types of serrated surfaces, such as knurled surfaces, may be utilized instead.

The housing 11 of coupling 10 may be utilized in conjunction with plastic pipe segments of various sizes by utilizing compression nuts, compression rings, retainer rings and gaskets having an inside diameter corresponding to the outside diameter of the pipe segment. The ability of a single sized coupling housing to accommodate different sized pipe segments is achieved through the provision of the second retainer ring 36, which prevents deformation of gasket 35 when the outside diameter of the pipe segment is less than the inside diameter of bore section 16. In those instances where the outside diameter of the pipe segment corresponds closely to the inside diameter of bore section 16, as when the pipe has an outside diameter of 1⅜ inches in the illustrated embodiment, the second retainer ring 36 may be omitted, allowing gasket 35 to bear directly against shoulder 20. In practice, a single-sized housing has proved capable of accommodating pipes having outside diameters of 1⅜ inches, 1⅛ inches, 1 5/16 inch and 1 1/16 inch.

When installing coupling 10 on the end of a plastic pipe segment, it is merely necessary to insert stiffener 40 into the open end of the segment until its flange abuts the end of the segment, and then to insert or "stab" the assembled pipe segment and stiffener into bore 14 until the stiffener abuts shoulder 22. At this point the compression nut 24 is turned into the housing, simultaneously causing radial deformation of grip ring 30 by reason of the coacting wedge surfaces 31 and 33, and compression of gasket 35 by reason of the inward movement of the grip ring resulting from the inward movement of compression nut 24. Ultimately, gasket 35 is compressed to an extent sufficient to cause radial deformation sufficient to form a seal between the outer surface of pipe 23 and housing 11, and grip ring 30 is radially deformed to an extent sufficient to bring the outside and inside surface of wall of pipe 23 into a secure mechanical engagement with the serrated surfaces of grip ring 30 and stiffener 40, respectively. The compresion nut is dimensioned such that its inner shoulder will come into abutting relationship with the end of housing 11 prior to sufficient force being developed to strip the threads between these elements, thereby providing built-in protection against overtorqueing of the pipe fitting.

It is not necessary to disassembly the coupling assembly prior to insertion of the pipe segment. It is only necessary that prior to insertion the compression nut 24 not be tightened down, i.e., be only partially engaged to the threads of the housing. This ability of the coupling to receive a pipe segment without disassembly not only reduces assembly time, but also obviates the possibility of parts of the coupling becoming lost during assembly.

To prevent compression nut 24 from separating from the coupling, an external shield 43 may be fitted over the compression nut. This shield may comprise a bracket-like structure formed of metal or similar material having a first semi-arcuate portion positioned about the circumference of the pipe segment at one end, and a second semi-arcuate portion positioned about the outside surface of the coupling body at its other end. In addition to preventing lateral separation of compression nuts 24 from body 11, this shield may serve to establish electrical continuity between connecting pipe segments where the segments are formed of electrically conductive material.

In accordance with another aspect of the invention, a coupling is provided which can be utilized in conjunction with plastic pipe segments 23 having internal electrically conductive liners 49 (FIG. 5). Such liners are ordinarily formed of a thin metal such as aluminum along the inside surface of the pipe wall for the purpose of maintaining the pipe and its contents at a uniform electrical potential. When joining two such electrically conductive pipe segments, the problem arises of maintaining an electrically conductive path between the connecting segments. Failure to maintain electrical continuity can result in the development of a potential difference between the liners of adjacent segments, and ultimately arcing between the segments with an attendant danger of explosion.

Referring to FIG. 5, this danger is obviated by providing an electrically conductive collar 50 within bore 14 between the stiffeners of connecting pipe segments. Collar 50, which may be machined from a metal or other hard electrically conductive substance, includes annular shoulders 51 and 52 on opposite surfaces for receiving in abutting relationship the flange portions 41 of connecting stiffeners 40. Since continuity is maintained between the stiffeners and collar 50 when compression nuts 24 are tightened, and since the stiffeners are in electrical contact with the liners 49 of respective ones of the pipe segments, the desired electrical connection between the liners is established.

Electrical continuity may be maintained between collar 50 and an external monitoring or grounding point by means of a machine screw 53 which extends through body 11 and into a threaded bore 54 provided in the side of the collar. This screw may also extend through the shield 43 provided over the coupling housing to prevent separation of compression nuts 24 from body 11. An electrical conductor 55 may be attached to the machine screw 53 for locating purposes or to establish electrical continuity with a remote monitoring location. It will be appreciated that collar 50 may be utilized in conjunction with metal pipe segments as well in which case liners 49 may not be present.

Although shown in connection an in-line coupling for connecting two pipe segments together, it will be appreciated that the invention resides in an end fitting which can be utilized in coupling a pipe segment to any source or utilization means. For example, with appropriate changes to its body portion a fitting is obtained which can be utilized in conjunction with a service head for connection to a feeder pipe segment. Another possible modification is shown in FIG. 4, wherein the body is molded in the form of a T having three end fittings to obtain a T connector suitable for joining three pipe segments. The body portion of the fitting may be molded in practically any shape to accommodate a wide range of applications.

One material which has proven particularly satisfactory for forming the body and compression nut of the fitting is glass filled nylon. This material provides exception structural strength, a necessary characteristic if failure of the threads between the body and the compression nut is to be avoided under conditions of high axial stress. A further atrribute of this material is that it is highly resistant to corrosion and has a low moisture absorption characteristic, making it particularly attractive for burial underground. Retainer rings 34 and 36, and stiffener 40 are preferably formed of an appropriate metal such as steel, and gasket 35 is preferably formed of an elastomeric material such as buna'N' rubber.

Although the fitting of the invention is particularly well adapted for connecting to plastic pipe segments, it can be utilized to connect to metal pipe sections as well by elimination of stiffener 40. Furthermore, although the fitting is most advantageously formed of a plastic or nylon material, it can be partially or wholly formed of other materials such as metal or steel where required by a particular application.

Although particularly well suited for use in underground natural gas distribution systems, the fitting of the invention may be utilized in any type of gas or liquid system where pipe segments must be joined with a high degree of reliability and efficiency. In this regard the fitting provides the advantages of a metal coupling while being less expensive, more corrosion resistant, and easier to install. Furthermore, the body of the fitting is readily adaptable to different sized plastic pipe segments, thereby reducing the need for maintaining a large inventory of different bodies for accommodating different types of pipe segments. Since the plastic pipe segments can be inserted or "staked" without disassembly of the fitting, there is no danger of components of the fitting becoming lost or misassembled.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

I claim:

1. A coupling for joining two pipe segments each having an electrically conductive inner liner comprising, in combination:

a body including an open-ended bore extending through at least an end portion of respective ones of said pipe segments, the sidewall of said bore including a first pair of annular shoulder portions forming regions of increased diameter between said shoulder portions and the adjoining open end of said bore;

a pair of compression nuts each having an inside diameter substantially corresponding to the outside diameter of said pipe segments, an outside diameter substantially corresponding to said regions of increased diameter of said bore, and a radially inwardly facing inclined inside surface, said compression nuts being threadedly engaged to said body at respective ends of said bore whereby said nuts are displaced inwardly along the axis of said bore when turned relative to said body;

a pair of grip rings disposed over said pipe segment within respective ones of said regions of increased diameter of said bore, said grip rings each including a gap in the circumference thereof, and each having an outside surface complimentarily radially outwardly inclined to the inclined inside surface of respective ones of said compression nuts and arranged in close relationship therewith, means including a pair of generally sleeve-shaped stiffeners having diameters substantially corresponding to the inside diameters of respective ones of said pipe segments and extending along the interior passageway of respective ones of said pipe segments in electrical contact with the liners thereof from the open ends thereof for preventing deformation of the walls of said segments, and means including a pair of gaskets disposed over said pipe segment within respective ones of said regions of increased diameter of said bore for forming a seal between the outer surfaces of said pipe segments and the wall of said bore, said grip rings and said gaskets being radially compressed into engagement with the outer walls of respective ones of said pipe segments when said compression nuts are tightened; and means including an electrically conductive collar disposed within said bore between the open ends thereof for engaging respective ones of said collars to form an electrical connection therebetween.

2. A coupling as defined in claim 1 wherein said pipe segment is formed of a plastic material.

3. A coupling as defined in claim 1 wherein the sidewall of said bore includes a second annular shoulder portion inwardly of said first shoulder portion, and said stiffener bears against said second shoulder portion.

4. A coupling as defined in claim 1 wherein the inside surface of said grip ring and the outside surface of said stiffener include a plurality of outwardly projecting serrations for engaging the wall of said pipe segment.

5. A coupling as defined in claim 4 wherein said serrations are sawtooth-shaped and orientated to oppose withdrawal of said pipe segment from said bore.

6. A coupling as defined in claim 1 wherein said grip ring includes a plurality of inwardly projecting serrations for mechanically engaging the outer surface of said pipe segment.

7. A coupling as defined in claim 6 wherein said serrations are saw-tooth shaped and orientated to oppose withdrawal of said pipe segment from said bore.

8. A coupling as defined in claim 1 wherein said gap of the grip ring is through the full axial extent of said grip ring, and said fitting includes an annular retaining ring disposed over said pipe segment between said grip ring and said gasket for preventing deformation of said gasket into the gap.

9. A coupling as defined in claim 8 wherein said fitting includes a second annular retaining ring disposed over said pipe segment between said gasket and said first shoulder portion.

10. A coupling as defined in claim 1 wherein said body and said compression nut are formed of glass impregnated nylon.

11. A coupling as defined in claim 1 wherein said grip ring and said stiffener include a plurality of radially aligned serrations for engaging the wall of said pipe segment.

12. A pipe fitting as defined in claim 1 wherein said stiffeners each include flange portions extending beyond the ends of respective ones of said pipe segments, and wherein said collar includes a pair of annular shoulder portions facing respective open ends of said bore for receiving respective ones of said flange portions.

13. A coupling as defined in claim 1 wherein said inwardly facing inclined inside surface of said compression nut is open toward said annular shoulder portion of said bore.

14. A coupling as defined in claim 1 wherein said first annular shoulder portion of the side wall of said bore forms a first region of maximum diameter between said first annular shoulder portion and the open end of said bore, a second annular shoulder portion forms a region of intermediate diameter between said second shoulder portion and said first shoulder portion, said compression nut outside diameter substantially corresponds to said region of maximum diameter of said bore, and said compression nut has an inwardly facing inclined inside surface open toward said first annular shoulder portion.

15. A coupling as defined in claim 1 wherein said stiffener has an outside surface having a slight inward taper.

* * * * *